Patented Nov. 11, 1952

2,617,827

UNITED STATES PATENT OFFICE 2,617,827

BIS-1,4-DIALKYLAMINO-1,3-BUTADIENES

Charles H. McKeever, Glenside, and Joseph W. Nemec, Philadelphia, Pa., assignors to Rohm & Haas Company, Philadelphia, Pa., a corporation of Delaware No Drawing. Application May 11, 1950, Serial No. 161,480

7 Claims. (Cl. 260—583)

This invention relates to bis(1,4-dialkylamino)-1,3-butadienes in which the alkyl groups contain not over two carbon atoms each and to a method for the preparation of these compounds.

This method is based on the discovery that when a bis(1,4-dialkylamino)-2-butyne is passed in vapor form over an active chromium oxide catalyst at 300°–450° C., an isomerization takes place. Although the reaction is exothermic, the success of the reaction apparently depends upon a complex formation between catalyst and dialkylaminobutyne which greatly reduces the energy of activation necessary to bring about the isomerization and the formation of the new compounds, bis(1,4-dimethylamino)-1,3-butadiene and bis(1,4-diethylamino)-1,3-butadiene.

Preparation of the starting materials bis-(1,4-dimethylamino)-2-butyne and bis(1,4-diethylamino)-2-butyne may be accomplished according to the method described in U. S. Patent No. 2,273,141, issued February 17, 1942. Dimethylamine or diethylamine, formaldehyde, and acetylene are reacted together in the presence of a heavy metal of the first or second group of the periodic table. In particular, copper and its salts such as cuprous chloride, copper acetate, or copper formate are effective catalysts. Temperatures up to about 120° C. may be used. By use of stoichiometric proportions for forming the butyne derivative or by use of excess of secondary amine and formaldehyde over that theoretically required for the reaction with acetylene, the chief product becomes a bis(dialkylamino)butyne and the alkylaminopropynes are formed in minor amounts. The desired bis(alkylamino)butynes are separated by distillation.

The vapor phase isomerization is accomplished by passing the vapors of a bis(dialkylamino)-butyne over an active chromia catalyst at 300°–450° C. The chromia catalyst may be carried on an inert material such as pumice, silica, or alumina. Active copper-chromium oxide catalysts are effective also. After an active chromium oxide catalyst has been in use, it decreases in effectiveness, but can be reactivated by passing a stream of air thereover at a temperature of 300°–400° C.

A catalyst which gave good conversions of the butynes to the butadienes was prepared by refluxing aqueous ethanol with chromic acid and silica gel for 15 hours and baking the chromia-silica product at 400° C. for 10 hours. This catalyst was reactivated by passing air over the used catalyst for 15 hours at 350° C.

This catalyst gave conversions of 30% to 35% with yields of 80%. The optimum temperature was 320°–330° C. A space velocity of 0.2 to 0.7 (ml./cc./hr.) was found satisfactory.

The bis(dialkylamino)butadiene was separated from unchanged bis(dialkylamino)butyne by distillation under reduced pressure. Some decomposition was indicated by a small amount of tar and of dimethylamine in the reaction products. In the lighter fractions from the bis(dimethylamino)butyne isomerization there are also found small amounts of N-methylpyrrole, 2-methylpyrrole, and pyridine.

The preparation of bis(dialkylamino)butadienes is further described in the following illustrative examples.

Example 1

Bis(1,4-dimethylamino)-2-butyne was vaporized and passed through a tube containing a catalyst of chromium oxide carried on finely divided silica which was heated to 340° C. The space velocity was 0.5 (ml./cc./hr.). The crude yield for the first half hour was 78%. The conversion fell off with time. The product was collected and redistilled at 61°–62° C./1 mm. It corresponded in composition to

$(CH_3)_2NCH=CHCH=CHN(CH_3)_2$

It has an index of refraction of 1.5550. This compound is an oil which darkens on storage. It is a useful intermediate yielding succindialdoxime, succindialdehyde, and the corresponding phenylhydrazones and semicarbazones. It may be useful as a base for forming bisquaternary salts. Upon reduction it yields bis(dimethylamino)butane, from which quaternary salts of high disinfecting power are obtained upon reaction with an alkylating agent.

Example 2

Bis(1,4-diethylamino)-2-butyne was volatilized and passed through a 2 x 100 cm. tube containing 50 cc. of Raschig rings and 160 cc. of an active chromium oxide catalyst heated at 320° C. The space velocity was 0.4. The heat of reaction carried the temperature to 350° C. The conversion was 10% and the yield was 30% during the period of operation. The product obtained corresponded in composition to

$(C_2H_5)_2NCH=CHCH=CHN(C_2H_5)_2$

It was distilled at 90°–93° C./1 mm. and has a refractive index of 1.5330. This compound undergoes the reactions described for the homologue of Example 1.

Example 3

The procedure of Example 1 was followed with bis(1,4-dimethylamino)-2-butyne. A chromia-aluminia catalyst was used at a temperature of 360°–380° C. The vapors of the above compound were passed over the catalyst, about 250 grams being passed in 3.5 hours. The over-all yield of bis(1,4-dimethylamino)-1,3-butadiene was 38%. This catalyst was reactivated by passing air thereover at 400° C. for two hours. The reactivated catalyst was used in the same way with about the same yield of desired product.

By the same procedures bis(dimethylamino)-butyne and bis(diethylamino)butyne were isomerized over active chromia catalysts at temperatures of 310°–340° C., 350°–370° C., and 420°–430° C. In all cases the corresponding butadienes were obtained. Yields were somewhat less at the highest temperature range and there was evidence of increased thermal decomposition. The desired products were, nevertheless, obtained.

We claim:

1. A process for preparing bis(1,4-dialkylamino)-1,3-butadienes in which the alkyl groups contain not over two carbon atoms each which comprises passing the vapors of a bis(1,4-dialkylamino)-2-butyne, in which the alkyl groups contain not over two carbon atoms each over a catalyst having chromia as the essential active agent at 300°–450° C.

2. A process for preparing bis(1,4-dimethylamino)-1,3-butadiene which comprises passing the vapors of bis(1,4-dimethylamino)-2-butyne over a catalyst having chromia as the essential active agent at 300°–450° C.

3. The process of claim 2 in which the catalyst is an active chromia catalyst supported on silica and the temperature is 320°–330° C.

4. A process for preparing bis(1,4-diethylamino)-1,3-butadiene which comprises passing bis(1,4-diethylamino)-2-butyne in vapor form over a catalyst having chromia as the essential active agent at a temperature between 300° and 450° C.

5. As a new chemical compound, a bis(1,4-dialkylamino)-1,3-butadiene in which the alkyl groups contain not over two carbon atoms each.

6. As a new chemical compound, bis(1,4-dimethylamino)-1,3-butadiene.

7. As a new chemical compound, bis(1,4-diethylamino)-1,3-butadiene.

CHARLES H. McKEEVER.
JOSEPH W. NEMEC.

REFERENCES CITED

The following references are of record in the file of this patent:

FOREIGN PATENTS

| Number | Country | Date |
| --- | --- | --- |
| 619,206 | Great Britain | Mar. 4, 1949 |

OTHER REFERENCES

Beilstein, vol. 3–4, 2nd Supp., p. 714, Edwards Bros., Ann Arbor, Mich., 1943.